No. 677,635. Patented July 2, 1901.
J. N. CALLAHAN & J. D. SHORT.
VEHICLE BRAKE.
(Application filed Mar. 26, 1901.)
(No Model.)
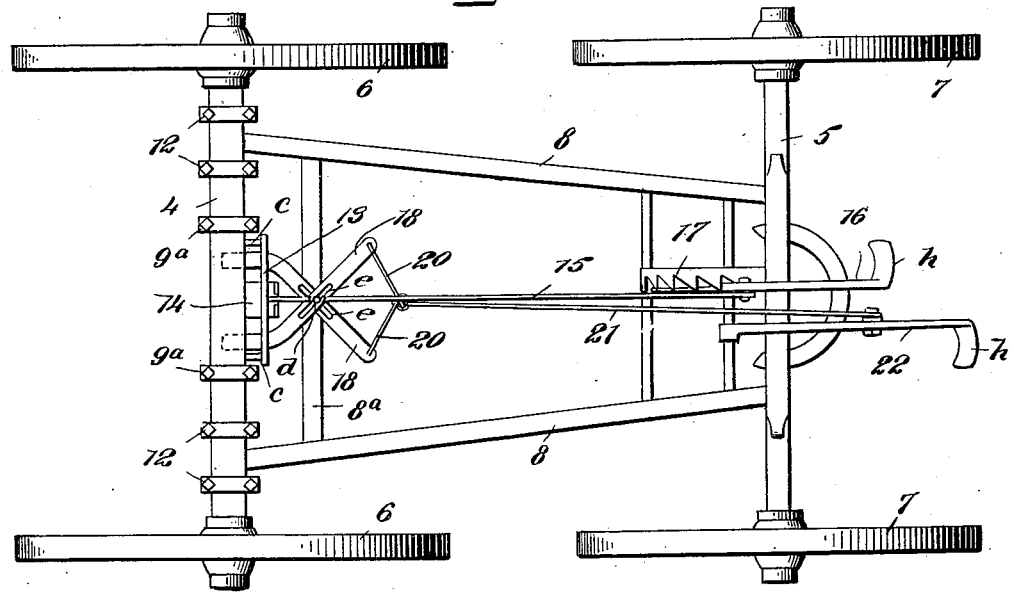
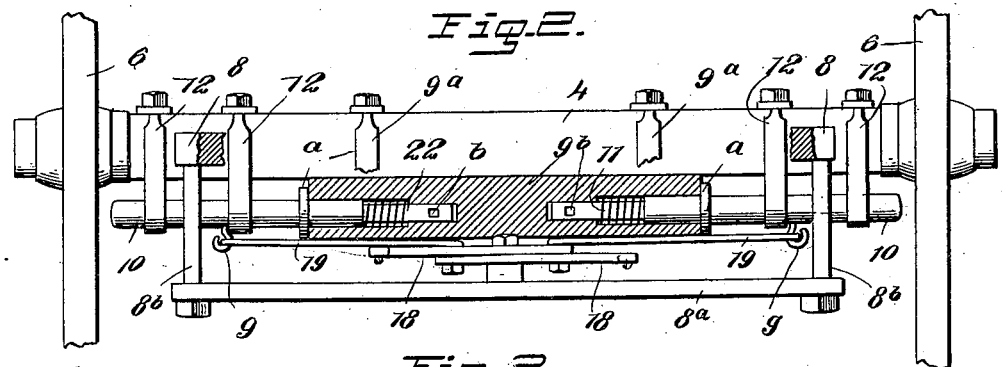
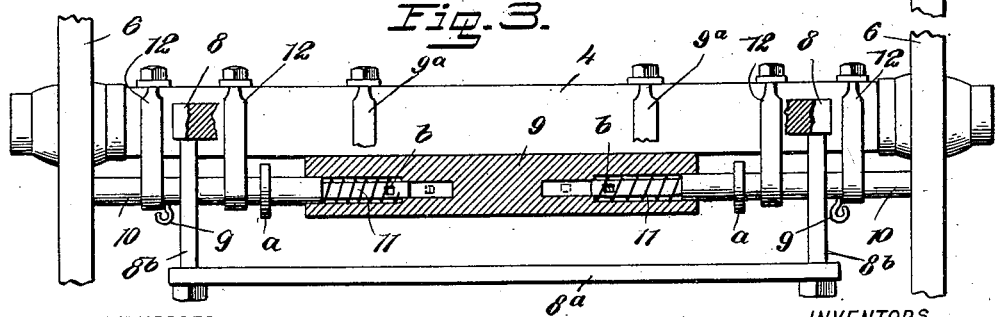
WITNESSES:
INVENTORS
Joseph N. Callahan
Jefferson D. Short
BY
ATTORNEYS

UNITED STATES PATENT OFFICE.

JOSEPH NELSON CALLAHAN AND JEFFERSON DAVIS SHORT, OF HENRIETTA, NORTH CAROLINA.

VEHICLE-BRAKE.

SPECIFICATION forming part of Letters Patent No. 677,635, dated July 2, 1901.

Application filed March 26, 1901. Serial No. 52,944. (No model.)

*To all whom it may concern:*

Be it known that we, JOSEPH NELSON CALLAHAN and JEFFERSON DAVIS SHORT, citizens of the United States, and residents of Henrietta, in the county of Rutherford and State of North Carolina, have invented new and useful Improvements in Vehicle-Brakes, of which the following is a full, clear, and exact description.

This invention relates to the type of vehicle-brakes which effect a positive lock between a vehicle-axle and the wheels thereon, and has for its object to provide a vehicle-brake of the character indicated which is of novel simple construction, is adapted for perfect control by a person in the vehicle, which may be readily adjusted to positively lock the vehicle-wheels on the rear axle for the safety of the occupants of the vehicle, and by convenient change in adjustment be released for the free movement of said wheels.

The invention consists in the novel construction and combination of parts, as hereinafter described, and defined in the appended claims.

Reference is to be had to the accompanying drawings, forming a part of this specification, in which similar characters of reference indicate corresponding parts in all the figures.

Figure 1 is a plan view of a vehicle, the body being removed, and of the improved brake thereon. Fig. 2 is an enlarged front view of the rear axle of the vehicle, fragmentary wheels thereon, and a partly-sectional front view of details of the improvement carried by said axle, showing the brake mechanism in unlocked condition; and Fig. 3 is a view substantially similar to Fig. 2, showing the brake mechanism adjusted to positively lock the vehicle-wheels.

In the drawings, which show the construction and application of the invention, 4 indicates the rear axle, 5 the front axle, and 6 and 7 the wheels rotatably secured on the rear and front axles, as usual. The axles 4 and 5 may be connected by reach-bars 8 8, secured by their rear ends to the rear axle and at their forward ends are attached to a sandboard and fifth-wheel device, which permits the front axle and the wheels thereon to swing in the usual manner.

A guide-block 9 is secured upon the lower side of the rear axle 4 by clip-bands $9^a$ or other suitable means, and said block, which is of less length than the axle, is held thereon, so that the ends of the block will be evenly spaced from the hubs of the wheel 6, as shown in the drawings. The guide-block 9 is longitudinally perforated from each end to a suitable depth for the reception of the similar locking-bars 10.

As shown in Figs. 2 and 3, the locking-bars 10 slidably fit in the perforations in the guide-block 9, which perforations may be reduced in diameter at and near their inner ends for the reception of reduced end portions of the locking-bars, and upon each of said reduced portions of the locking-bars a strong spiral spring 11 is mounted, which is adapted to push the bar outward.

The body of each locking-bar 10 may be rounded where it extends outside of the guide-block and also have a collar or other projection $a$ thereon, which defines the sliding movement of the locking-bar within the guide-block, as shown in Fig. 2, the exterior portion of each locking-bar being held to slide by the guide-brackets 12, which depend from the axle 8. Near the inner end of each locking-bar 10 a transverse orifice $b$ is formed therein for the reception of a detent-pin $c$, which loosely fits the orifice and projects rearwardly from a slide-bar 13, that may be loosely supported on a bracket-plate 14, which projects forwardly from the axle 4 near its longitudinal center, as shown in Fig. 1.

The slide-bar 13 is parallel with the axle 4 and is attached to the rear end of an elongated link-rod 15, which extends forwardly and at the front end is pivoted upon the upright lever 16, intermediately of the ends thereof. A toothed rack 17 is supported in an upright position adjacent to the lever 16, and the latter by its rocking adjustment may be engaged with an appropriate tooth of the rack 17, and thus be adapted to either slide the bar 13 rearwardly or forwardly.

A brace-bar $8^a$, which is hung from the reach-bars 8 by the arms $8^b$ near the rear axle 4, affords loose support for the two like members 18 of a lazy-tongs lever, which cross near their centers of length and are pivoted upon the brace-bar by a pivot-bolt $d$, that passes loosely through the crossed slots $e$, formed in the parts 18 at and near their point of lapped contact. The rear end portions of the members 18 may be bent edgewise, so as to render them parallel, and said end portions project below the guide-block 9, as indicated in Figs. 1 and 2. Upon the rear ends of the lazy-tongs members 18 the ends of similar connecting-rods 19 are pivoted, and the opposite ends of said rods have a loose engagement with projections g, that are affixed to the locking-bars 10. The forward extremities of the lazy-tongs members 18 have the rear ends of short link-rods 20 loosely connected therewith, the opposite ends of these link-rods being in a like manner secured to the rear end of a pusher-rod 21, which at the forward end is pivoted upon the upright lever 22, which is rockably supported at its lower end upon a support carried by the running-gears of the vehicle.

The levers 16 and 22 are so positioned that they may be upwardly extended through suitable openings in the floor of the vehicle-body, near the front thereof, and, as shown in Fig. 1, the upper extremities of the levers may have foot-pads h thereon to permit a rocking movement to be effected by the feet of the driver who may occupy the vehicle having the improvements.

It will be seen that a forward movement given to the upper end of the lever 22 will cause the rear ends of the lazy-tongs lever to approach each other, which will correspondingly slide the locking-bars 10 away from the wheels 6 and compress the springs 11.

When the lever 22 is actuated to move the locking-bars 10 inwardly against the stress of the springs 11, the operator simultaneously rocks the lever 16 rearwardly, so that the detent-pins c on the slide-bar 13 will press upon the inner portions of the locking-bars and enter the holes b therein when the pins and holes are brought opposite in pairs.

It will be seen that if the lever 16 is engaged with an appropriate tooth on the rack 17 when the detent-pins c have locked engagement with the bars 10, as explained, said locking-bars will be secured in retracted condition, but ready for instant use, as occasion may require.

In descending a steep hill the driver of the horse or team drawing the vehicle can at the brow of the hill release the locking-bars 10 by a rearward movement of the lever 16, which will withdraw the detent-pins c from the locking-bars, and this will permit the expansion of the springs 11, which will project the locking-bars outward and introduce them between the spokes of the wheels 6 near their hubs. As the positive locking of the wheels 6 by the bars 10 prevents the rotation of the wheels, this will produce frictional contact between the tires of the wheels and the road-bed, thus affording a very effective brake for the vehicle, which will prevent it from moving down the hill at a dangerous speed or crowding upon the team drawing the vehicle, so that the draft-animals may walk freely and not be required to hold back the vehicle. When the hill has been descended, the driver can by operating the levers 16 and 22, as before explained, retract the locking-bars 10 for the release of the wheels 6 and hold said bars in retracted adjustment.

It is evident that the improved safety-brake is adapted to arrest the dangerous speed of a fractious horse drawing the vehicle by its adjustment for service when needed, and, if desired, the usual friction-brake may be supplied for ordinary use, while the safety-brake is reserved for emergencies that render the common brake useless.

Having thus fully described our invention, we claim as new and desire to secure by Letters Patent—

1. The combination with a vehicle, of a guide-block on the rear axle, two locking-bars held to slide in the guide-bar, springs pressing the locking-bars outwardly, a lazy-tongs device adapted to retract the locking-bars and compress the springs, means for operating the lazy-tongs device from the front of the vehicle, and means for holding the locking-bars retracted against the stress of the springs but releasable from the front of the vehicle.

2. The combination with a vehicle, and a longitudinally-perforated guide-block on the rear axle thereof, of spring-pressed locking-bars slidable in the guide-block, a lazy-tongs device loosely supported on the running-gear of the vehicle and connected with the locking-bars for their retraction, an upright rockable lever at the front of the vehicle, and a pusher-rod pivoted by its respective ends to the lazy-tongs device and the upright lever.

3. The combination with a vehicle, a longitudinally-perforated guide-block held on the lower side of the rear axle of the vehicle, locking-bars slidable in the guide-block, and expansive springs pressing the locking-bars outward, of a lazy-tongs device comprising two crossed members held to rock on the runing-gear of the vehicle, like ends of said members being loosely connected by link-rods with the locking-bars, means for rocking the lazy-tongs members from the front of the vehicle, a slide-bar, detent-pins on said bar adapted to respectively engage within transverse apertures in the inner portions of the locking-bars, a toothed rack at the front of the vehicle, a link-bar extended forwardly from the slide-bar, and a lever pivoted between its ends upon the forward end of said link-bar and adapted to interlock with the teeth of the rack.

In testimony whereof we have signed our names to this specification in the presence of two subscribing witnesses.

JOSEPH NELSON CALLAHAN.
JEFFERSON DAVIS SHORT.

Witnesses:
M. A. WALDEN,
FRANK BRIGHT.